(12) United States Patent
Lanning

(10) Patent No.: US 8,127,190 B2
(45) Date of Patent: *Feb. 28, 2012

(54) SAMPLING A DEVICE BUS

(76) Inventor: Eric J. Lanning, San Jose, CA (US)

( * ) Notice: Subject to any disclaimer, the term of this patent is extended or adjusted under 35 U.S.C. 154(b) by 267 days.

This patent is subject to a terminal disclaimer.

(21) Appl. No.: 11/552,128

(22) Filed: Oct. 23, 2006

(65) Prior Publication Data

US 2007/0266183 A1 Nov. 15, 2007

Related U.S. Application Data

(60) Provisional application No. 60/774,588, filed on Feb. 17, 2006.

(51) Int. Cl.
*G01R 31/317* (2006.01)
*G01R 31/40* (2006.01)

(52) U.S. Cl. .............................. 714/732; 714/715

(58) Field of Classification Search .................. None
See application file for complete search history.

(56) References Cited

U.S. PATENT DOCUMENTS

| | | | | | |
|---|---|---|---|---|---|
| 4,907,081 | A | * | 3/1990 | Okamura et al. | 375/240.01 |
| 5,260,970 | A | * | 11/1993 | Henry et al. | 375/224 |
| 5,375,224 | A | * | 12/1994 | Larsen et al. | 710/33 |
| 5,531,614 | A | * | 7/1996 | Gallusser et al. | 439/607 |
| 5,561,691 | A | * | 10/1996 | Weinraub | 375/355 |
| 5,634,089 | A | * | 5/1997 | Kulbida et al. | 358/1.16 |
| 5,717,870 | A | * | 2/1998 | Dobson | 709/250 |
| 5,787,253 | A | * | 7/1998 | McCreery et al. | 709/231 |
| 6,240,087 | B1 | * | 5/2001 | Cummings et al. | 370/360 |
| 6,430,635 | B1 | * | 8/2002 | Kwon et al. | 710/104 |
| 6,963,219 | B1 | * | 11/2005 | Ghia et al. | 326/30 |
| 2003/0229827 | A1 | * | 12/2003 | Dun et al. | 714/48 |
| 2004/0066216 | A1 | * | 4/2004 | Spehar | 327/65 |
| 2005/0201537 | A1 | * | 9/2005 | Honda | 379/100.17 |
| 2005/0220237 | A1 | * | 10/2005 | Sandner et al. | 375/355 |
| 2005/0230487 | A1 | * | 10/2005 | Lapstun et al. | 235/494 |

FOREIGN PATENT DOCUMENTS

| TW | 341679 | 10/1998 |
|---|---|---|
| TW | 536890 | 6/2003 |

OTHER PUBLICATIONS

PCT/US07/62389, Sep. 10, 2008, ISR & written Opinion.
TW 096106029, Jul. 27, 2010, Office Action.

* cited by examiner

*Primary Examiner* — Cynthia Britt
*Assistant Examiner* — Dipakkumar Gandhi
(74) *Attorney, Agent, or Firm* — Matthew A. Pequignot; Pequignot + Meyers LLC

(57) ABSTRACT

A method for preparing tapped data for analysis. The data on a bus is sampled and latched at a certain rate to produce raw data. The raw data is then decoded by a pod that is configured for the protocol of the bus in a system under test. The decoded data can then be presented to a protocol analyzer for analysis. The decoded data and the corresponding raw data may also be aligned and then presented to an analyzer for protocol analysis.

18 Claims, 2 Drawing Sheets

SAMPLING A DEVICE BUS

CROSS REFERENCE TO RELATED APPLICATIONS

This application claims the benefit of U.S. Provisional Application Ser. No. 60/774,588, filed Feb. 17, 2006 and entitled SAMPLING A DEVICE BUS, which application is incorporated by reference in its entirety.

BACKGROUND OF THE INVENTION

1. The Field of the Invention

The present invention relates to analyzing signals between a host and a device by tapping the bus. More particularly, embodiments of the invention relate to sampling the bus in preparation for analysis of data on the bus.

2. The Relevant Technology

Protocol analyzers are devices that help diagnose and detect problems that occur on networks. Typically, protocol analyzers view traffic on the network or over a bus as it occurs. As the data is being monitored, the protocol analyzer may detect a problem or some defined condition. At this point, the analyzer triggers and captures the data present on the network or on the bus. The amount of data captured can depend on the size of the analyzer's buffer. The analyzer can also be configured such that the captured data represents data that occurred before the triggering event, after the triggering event, and/or both before and after the triggering event. In addition, the data can also be captured without a triggering event. Rather, data can be captured until the buffer is full. In effect, the capture is a snapshot of the data that was present on the network or on the bus around the time that a problem occurred or around a time that the analyzer was triggered. The captured data can then be analyzed to help resolve many problems and improve network communications or to improve communications between a host and a device.

Some protocols, however, are difficult to implement in analyzers. SD (Secure Digital Cards), SDIO (SD Input/Output Cards), MMC (Multimedia Cards) and CE-ATA (Consumer Electronics-Advanced Technology Attachment) are examples of protocols that are difficult to analyze.

Some of the reasons are related to the physical sizes of devices that use SD, SDIO, MMC or CE-ATA. Other reasons are related to the cost. CE-ATA connectors, for example, have a limited duty cycle. Because protocol analyzers are repeatedly connected and disconnected, cost can become a significant issue when analyzing CE-ATA. In addition, many consumer devices do not operate at the same voltage levels. This can complicate the issue of connecting a system to a protocol analyzer when the voltage levels are not known beforehand because the analyzer may not be able to distinguish between low and high signals. Further, when the bus is electrical in nature rather than optical, there are also issues related to impedance matching and capacitive loading.

BRIEF SUMMARY OF EMBODIMENTS OF THE INVENTION

These and other limitations are overcome by embodiments of the invention, which relate to systems and methods for sampling data on a bus between a host and a device or for analyzing such a system under test like the host and the device. In particular, embodiments of the invention relate to systems and methods for sampling data on a bus where the bus speed may be unknown, the operating voltage of the system under test may be unknown, and the like. Embodiments of the invention enable the bus to be sampled without knowing these parameters of the system under test. A system under test may be a host and a device such as a consumer device like a memory card of any form factor.

In one embodiment, a method for analyzing data on a bus to a system under test. The method typically begins by connecting a tap to the system under test. The tap typically provides a pass through bus between the host and the device and signals present on lines of the bus are not retimed. Next, the tap is connected with a pod that is in turn connected with a protocol analyzer. An ID provided by the tap enables the pod to be configured or programmed to handle the tapped data. Alternatively, the pod can be preprogrammed for the specific system under test. The pod can be reprogrammed for another system by the protocol analyzer in some embodiments.

Once the tap is properly connected, the tap or pod can begin to tap the signals on the lines of the bus by sampling the signals using a clock with a rate that is higher than the clock rate of the system under test. Preferably, the clock rate is more than twice the clock rate of the system under test. The signals on the lines (or on certain lines) of the bus are repeatedly sampled and latched to produce raw data. As a result, each bit of data typically corresponds to multiple samples of raw data. The raw data is then decoded to produce the decoded data, which can be presented to the protocol analyzer for analysis. In some instances, the pod can also provide certain functions such as state listing decoding, command listing decoding, timing waveforms, pre-capture filtering, post-capture filtering, triggering, real-time statistics, post-capture statistics, histogram and a tree view.

In one embodiment, the decoded data can be aligned with the sampled raw data. This alignment can be presented visually and may be used to identify problems with specific lines of the bus.

These and other advantages and features of the present invention will become more fully apparent from the following description and appended claims, or may be learned by the practice of the invention as set forth hereinafter.

BRIEF DESCRIPTION OF THE DRAWINGS

In order that the manner in which the advantages and features of the invention are obtained, a particular description of the invention will be rendered by reference to specific embodiments thereof which are illustrated in the appended drawings. Understanding that these drawings depict only typical embodiments of the invention and are not, therefore intended to be considered limiting of its scope, the invention will be described and explained with additional specificity and detail through the use of the accompanying drawings in which.

DETAILED DESCRIPTION OF THE PREFERRED EMBODIMENTS

Figure 1:
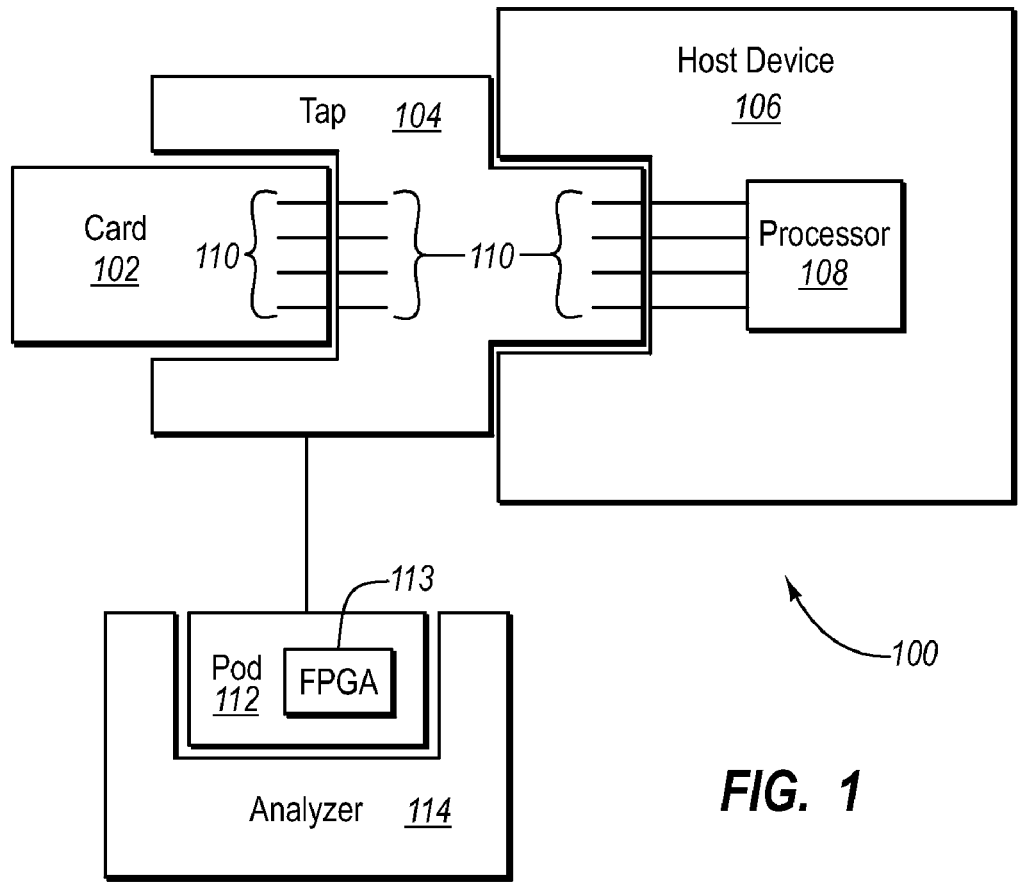
FIG. 1 illustrates an exemplary environment for implementing embodiments of the invention.

Embodiments of the invention overcome the limitations of conventional systems and relate to systems and methods for performing protocol analysis. More particularly, embodiments of the invention relate to systems and methods for preparing data on a bus for analysis by a protocol analyzer and include sampling methods. In general, data on a bus is sampled at some interval. The interval that the bus is sampled can be based on the expected frequency of the bus or can be based on a sampling clock or based on other criteria. Typically, the sampling rate is at least twice the rate of the bus.

The tap therefore taps the bus and the pod can then sample the signals provided by the tap to produce sampled data. Because the pod knows what kind of tap is attached and what kind of protocol is operative on the system under test, the pod can decode the sampled data into bytes, words, commands, and the like in accordance with the protocol. The decoded data is then provided to the analyzer for analysis. At the same time, the pod arranges or aligns the sampled data with the decoded data. For example, a byte of decoded data may be aligned with all of the bus samples that occurred for that byte. Advantageously, this provides a view of the decoded data along with what is actually happening on the bus.

A protocol analyzer in accordance with embodiments of the invention includes an analyzer, a pod and a tap board or tap. In addition, embodiments of the invention encompass both differential signaling and/or single ended signaling. Some of the differential inputs/outputs can also be implemented as single ended inputs/outputs. The tap is typically connected to the system under test in a manner than enables the tap to provide the signals on the system's bus to a pod. To deliver the tapped signals, the tap connects or interfaces with the pod and the pod, in turn, interfaces with the analyzer. Through these connections, the signals present on the bus can be presented to the analyzer. The pod can also perform some functions prior to delivering the tapped signals to the protocol analyzer.

The tap provides an ID that enables the pod to determine what type of tap is attached. The FPGA can be pre-programmed or programmed once the type of tap is determined. If the FPGA is pre-programmed for handling multiple protocols, the appropriate selection is made based on the ID. Alternatively, the FPGA can be programmed based on the ID of the tap. After identifying the type of tap that is attached, the pod understands how the data from the bus should be handled or processed. The pod can identify each line of the bus or identify the specific signals received from the tap and operate on them appropriately before providing the signals and/or other data to the analyzer. In one embodiment, the data sampled by the tap is received as a differential signal by the pod.

As discussed in more detail below, the pod typically includes an FPGA, micro-processor and/or application specific integrated circuit (asic) that processes the signals from the bus of the system being analyzed. The processes performed by the pod may include, but are not limited to, sampling the data that is provided by the tap, decoding the sampled data, and presenting the decoded data to the analyzer. For example, reading or receiving the tap's ID can instruct the pod how to handle or how to decode the data. In one example, the ID enables the pod and/or the analyzer to identify what each signal on the bus represents.

The pod may also include control status indicators such as LEDs. In one embodiment, the tap and the pod are separate and are connected using a cable. This enables a relatively inexpensive tap to be manufactured and which can be replaced as necessary. As previously indicated, some connectors have a relatively low insertion cycle count and requiring replacement of the pod is more costly than replacing a tap.

The pod can connect to the tap in at least two different ways. First, the tap board or tap can connect directly with the connector or through a cable. To insure signal integrity, LVDS (Low Voltage Differential Signaling) signaling may be used. Embodiments of the invention incorporate LVDS signaling in the tap to determine whether signals on the bus are high or low as described below. In some instances, voltage levels may be translated to comply with various signaling requirements of the tap, the pod, and/or the analyzer. For example, LVTTL signals in the FPGA may be converted to LVDS signals.

FIG. 1 illustrates an exemplary environment for implementing embodiments of the invention. FIG. 1 illustrates a system 100 for analyzing signals on a bus, network connection or other system. The system 100 includes, in this example, a host 106 that connects with a card 102. The host 106 and the card 102 represent the system under test and the bus that carries between the host 106 and the card 102 carries data, commands, and the like. The card 102 represents various media cards that include, but are not limited to, MMC (Multi Media Card) Card, RS-MMC (Reduced Size-MultiMedia Card), MMCplus, MMCmobile, DV (Dual Voltage) MMC cards, CE-ATA (Consumer Electronics-Advanced Technology Attachment) devices, SD (Secure Digital) Cards, DV (Dual Voltage) SD Cards, SDIO (SD Input/Output) Cards, XD cards, Memory Stick, and other cards or devices. Some of the devices, as indicated above, may also include drives. Examples of protocols that are supported include, but are not limited to 1394a, ATA/ATAPI, Cardbus, Logic Analysis, PCI/PCI-X/Compact PCI, PCMCIA/Compact Flash, SCSI, SATA, USB, MMC, SD, SDIO, CE-ATA and the like.

The host 106 is typically configured to read and/or write to the card 102 and the bus is typically bidirectional. The host 106 represents, by way of example and not limitation, consumer devices such as personal digital assistants, digital cameras, personal audio players, digital media players, digital recorders, cellular telephones, laptop computers, and the like or any combination thereof. The host 106 may also be a computer or a server computer or the like.

The communication between the card 102 and the host 106 occurs over the bus 110 that includes, in this example, the contacts that provide an electrical connection between the card 102 and the host 106. The tap 104 is a device that enables the analyzer 114 to view the traffic occurring on the bus between the card 102 and the host 106 with minimal interference to the bus or to the data on the bus. The form factor of the tap 104 is often dependent on the form factor dictated by the host 106 and/or the corresponding card 102. In some embodiments, the tap 104 may be configured to accept multiple form factors and/or cards that may use different protocols.

The tap 104 is separate, in one embodiment, from the pod 112 for several reasons. Some protocols have connectors that have a low insertion cycle count as previously described and the ability to replace the tap 104 when the connectors fail is advantageous compared to replacing the entire pod 112. A detachable tap 104 also facilitates use of the analyzer 114 in size constrained areas and for some testing situations, such as vibration testing of the system under test.

The data on the bus between the card 102 and the host 106 is received at a pod from the tap 104. The pod 112 is adapted to connect with the analyzer 114 although embodiments of the invention contemplate a pod 112 that is integrated with the analyzer 114. Also, the pod 112 can be reprogrammed for use with different protocols in some instances. When the pod 112 is detachable, the removability of the pod 112 from the analyzer 114 permits the analyzer 114 to be adapted to multiple busses, network connections, etc, by selecting the appropriate pod. Alternatively, the pod 112 may receive an ID signal from the tap 104 that indicates how the pod 112 should handle the signals being tapped. Similarly, the pod 112 may generate an ID signal that can be interpreted by the analyzer 114 such that the analyzer 114 knows which pod is attached and can run the appropriate analysis.

In one embodiment, a pod 112 can be used with multiple taps. For instance, the pod 112 may be used with an SD/MMC tap, a CE-ATA tap, or another tap. For a given tap or for a given protocol, the FPGA 113 can be programmed to prepare or decode the signals that are tapped according to the requirements of various protocols. For example, the FPGA can be programmed to handle multiple protocols. A single bitfile, for example, can program the FPGA to handle multiple protocols. In this case, the pod uses the tap ID to determine how to handle the data from the tap. Alternatively, the analyzer can use the tap ID and/or the pod ID to program the FPGA to handle or to decode the signals received from the bus through the tap. In this case, the bitfile used to program the FPGA is specific to a particular protocol. Typically, the actual programming of the FPGA is performed through an EEPROM, or through Select-Map pins through software. One of skill in the art can appreciate that the FPGA can be programmed in other ways as well.

For example, the specific protocol decoded by the pod is selected based on the ID signal provided by the attached tap. Alternatively, the pod 112, after receiving the ID signal, can then be appropriately programmed by the analyzer 114. In this example, the pod 112 is typically configured for the SD, SDIO, MMC or CE-ATA protocols. The pod 112 can support state listing decoding, command listing decoding, timing waveform, pre-capture filtering, triggering, real time statistics, histogram, post-capture statistics, post-capture filtering, tree view of the captured data, and other protocol functions.

Figure 2:
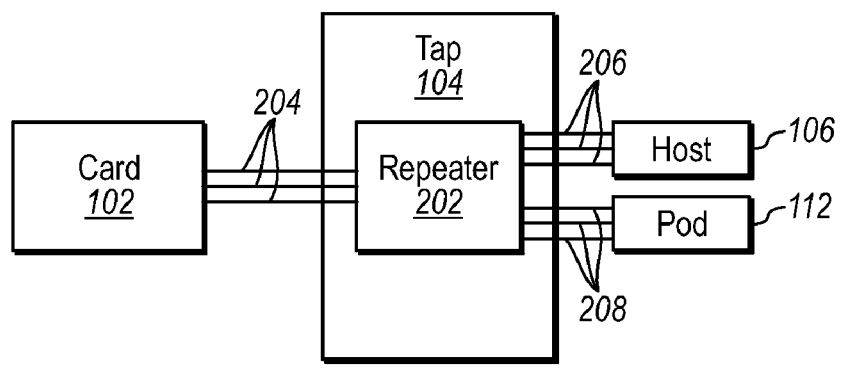
FIG. 2 illustrates one embodiment of a tap that interfaces with a bidirectional bus between a card and a host.

In one embodiment, the tap 104 is a pass-through tap in the sense that the digital signals are not retimed by the tap 104. Also, the bus may be a bi-directional bus. FIG. 2 illustrates an embodiment of the tap 104 that includes a repeater 202. The signals 204 from the card 102 are received by the repeater 202 and then passed through as the signals 206 to the host 106.

In another embodiment, the signals between the card 102 and the host 106 do not pass through the repeater. Rather, the tap 104 is configured such that the bus lines are tapped (using a via or the pins on the repeater for example) to branch off to the repeater 202. Thus, the signals 204 and the signals 206 are the same signals. The traces or vias that branch off to the repeater result in the signals 208 that are delivered to the pod 112. To minimize capacitive loading, the stubs created by branching off of the bus lines are kept as short as possible. In addition, there is no internal termination in the repeater 202 to maintain impedance matching.

Figure 3:
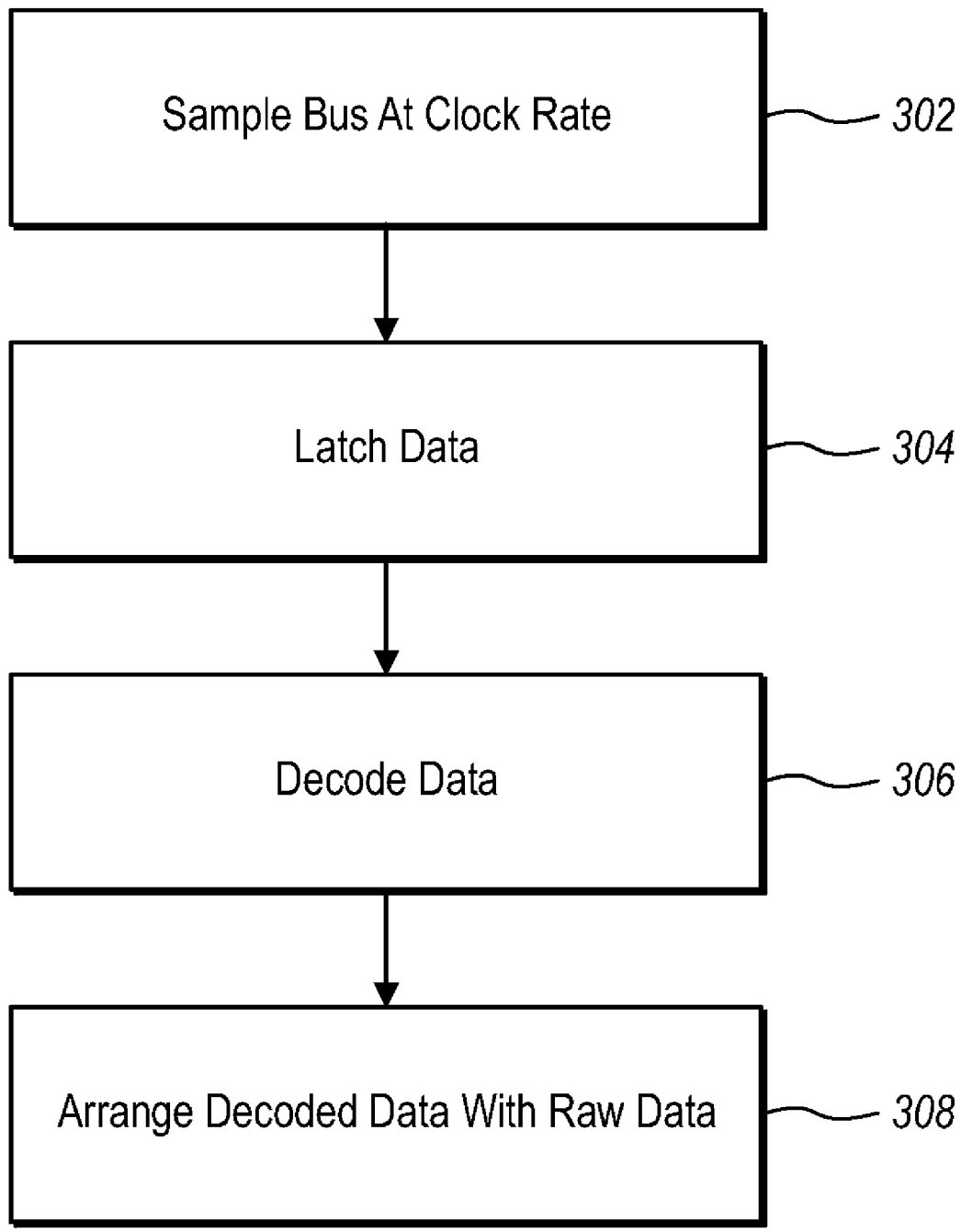
FIG. 3 illustrates an exemplary flow diagram for preparing data on the bus for analysis.

FIG. 3 illustrates an exemplary flow diagram for preparing data tapped from the bus of the system under test for analysis. The pod, using the tap that is tapping the bus, samples 302 the bus at various intervals. Sampling the bus may be achieved using a clock signal generated by the pod rather than using the clock signal of the host. This ensures that the rate of the sampling clock is sufficiently fast to effectively sample and latch the data on the bus. For example, if the bus operates from 0 to 52 MHz (although embodiments of the invention contemplate other clock speeds including higher frequencies), then the rate of the sample clock may be, by way of example only, 125 MHz.

Each line of the bus is sampled (the width of the bus may be 1×, 2×, 4×, or 8×, although other bus widths are contemplated by embodiments of the invention). Typically, the bus is sampled at twice the clock rate. Preferably, the bus is sampled more than twice the bus rate. In one embodiment, the bus is sampled on the rising edge of a clock signal, when the data on the bus is valid. Then data on the bus is then latched 304 and the latched data represents the raw data on the bus. Each bit in the data on the bus may be sampled more than once.

The process of sampling the bus and latching the data is repeated until a byte (or other appropriate segment of data) is obtained. The pod can then decode 306 the byte or other segment. The decoded data can then be provided to the analyzer for protocol analysis. The decoding performed by the pod may include, but is not limited to, state listing decoding (which results in a display of a chronological list of captured events by the analyzer), and command listing decoding. The pod also includes modules for performing timing waveform (which shows a signal level representation of the trace), pre-capture filtering, triggering, real time statistics, a histogram, and alignment of raw data with decoded data. The pod may also provide support for functions of the analyzer that may include, post-capture statistics, post-capture filtering, and a tree view of the captured data.

The pod has two different representations of the data on the bus. One representation is the raw data or the sampled data. Typically, the decoded byte corresponds to multiple samples. The pod also has the decoded bus data. The pod then aligns or arranges 308 the raw data with the decoded data for analysis.

By presenting the raw data aligned with the decoded data, the analyzer or a user can identify, by way of example, problems that may occur on specific lines of the bus or when, during a particular command, the error occurred. The pod can send pipelined data to the analyzer that includes the raw data and/or the decoded data for further analysis. The raw data and the corresponding decoded data can also be displayed for visual appreciation of the data on the bus.

In one embodiment, the interface between the pod and the analyzer can have multiple channels including single ended channels and/or differential channels. The pin count of the FPGA in the pod can be minimized by using a chip that may also perform signal translation. For example, a LVTTL signal generated by the FPGA may be translated to an LVDS signal that may be required by the analyzer. In addition, the FPGA may include banks that use LVTTL signaling. As a result, some of the banks of the FPGA that provide power can use certain signals (VREF, VRP, and VRN for example, as general purpose I/O pins. This is possible when LVTTL signaling is used. Further, the internal voltages can be changed in order to better receive LVDS signals when necessary. The pod may also include a JTAG port for using in programming the FPGA and for debugging purposes.

Software operating on the analyzer can read an ID of the pod to know which pod is being used. The software of the analyzer can also read the ID on the tap via the pod. This enables the analyzer software to identify how to handle any data that is tapped from the bus 302.

The interface between the tap and the pod typically includes a plurality of differential signals, as described above. The interface also includes Vcc, GND, a pod supplied reference voltage that can be selected by the jumper, and one or more ID lines. The ID lines enable the pod to determine the type of tap that is connected and to determine how to prepare the data tapped from the bus for the analyzer.

The present invention may also be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A method for analyzing tapped data on a bus having a plurality of lines between a host and a device, the method comprising:

providing a tap board that taps the bus between the host and the device;

sampling the bus using the tap board to produce raw data;

decoding the raw data to produce decoded data;

aligning a portion of the decoded data with corresponding samples of the raw data;

sending a first ID from the tap board to a pod connected to the tap board indicative of what type of tap is attached;

selecting a protocol of the bus from multiple protocols for analysis based on the first ID; and programming the pod to handle the selected protocol, wherein the pod provides the aligned portion of the decoded data and raw data samples to a protocol analyzer for analysis.

2. The method of claim 1, wherein providing the tap board that taps the bus further comprises providing a tap board that taps each line of the bus.

3. The method of claim 1, further comprising one or more of:

generating a timing waveform from the decoded data;

generating a tree view from the decoded data; or triggering based on the decoded data.

4. The method of claim 1, further comprising:

sending a second ID from the pod to the analyzer such that the analyzer knows which pod is attached; and selecting a type of analysis based on the second ID.

5. The method of claim 1, further comprising providing a pass through bus with the tap board without retiming signals present on the bus between the host and the device.

6. The method of claim 1, further comprising analyzing each line of the bus using the alignment of each sample of raw data to a corresponding bit.

7. A method for analyzing data in a system under test, the system including a host and a device, the method comprising:

connecting a tap to the system under test, wherein the tap provides a pass through bus having a plurality of lines between the host and the device;

connecting the tap with a pod that is connected with a protocol analyzer;

receiving an ID from the tap at the pod, wherein the protocol analyzer uses the ID to configure the pod for a protocol operating in the system under test;

repeatedly sampling the pass through bus based on a clock provided by the pod to produce a segment of raw data;

repeatedly sampling the bus by latching data on the rising and/or falling edge of the clock until a segment of data is obtained and represented by raw data, wherein each bit in the segment of data is sampled and latched more than once;

at the pod, decoding the segment of raw data into decoded data; and at the pod, aligning the segment of raw data with the decoded data.

8. The method of claim 7, wherein repeatedly sampling the pass through bus further comprises tapping lines of the bus without retiming the signals on the lines of the bus.

9. The method of claim 7, further comprising one or more of:

generating a state listing from the decoded data; or generating command decoding from the decoded data.

10. The method of claim 7, further comprising visually presenting the segment of raw data aligned with the decoded data, such that each bit of the decoded data is associated with a plurality of samples of the segment of raw data.

11. The method of claim 10, further comprising identifying a problem with a particular line of the pass through bus based on the alignment of the segment of raw data with the decoded data.

12. The method of claim 7, wherein the segment of raw data corresponds to a byte of data.

13. The method of claim 7, wherein repeatedly sampling the pass through bus further comprises sampling one bit on each line of the bus.

14. The method of claim 7, further comprising preparing the decoded data for the protocol analyzer.

15. The method of claim 7, further comprising receiving the segment of raw data from the tap as low voltage differential signals.

16. The method of claim 15, further comprising adjusting internal voltages of an FPGA in the pod to accommodate the low voltage differential signals.

17. The method of claim 16, further comprising translating signals generated by the FPGA into a form that is required by the protocol analyzer.

18. The method of claim 16, further comprising translating LVTTL signals to LVDS signals.

* * * * *